Aug. 19, 1952   M. LUDWIG ET AL   2,607,459
RETARDING ROLLER FOR CONVEYERS
Filed Sept. 14, 1948   2 SHEETS—SHEET 1

Inventors
Milton Ludwig
William R. Postlewaite
by  JN Adams
Walter G. Miller
Ralph L. Freeland, Jr.
Attorneys Aug. 19, 1952   M. LUDWIG ET AL   2,607,459
RETARDING ROLLER FOR CONVEYERS
Filed Sept. 14, 1948   2 SHEETS—SHEET 2
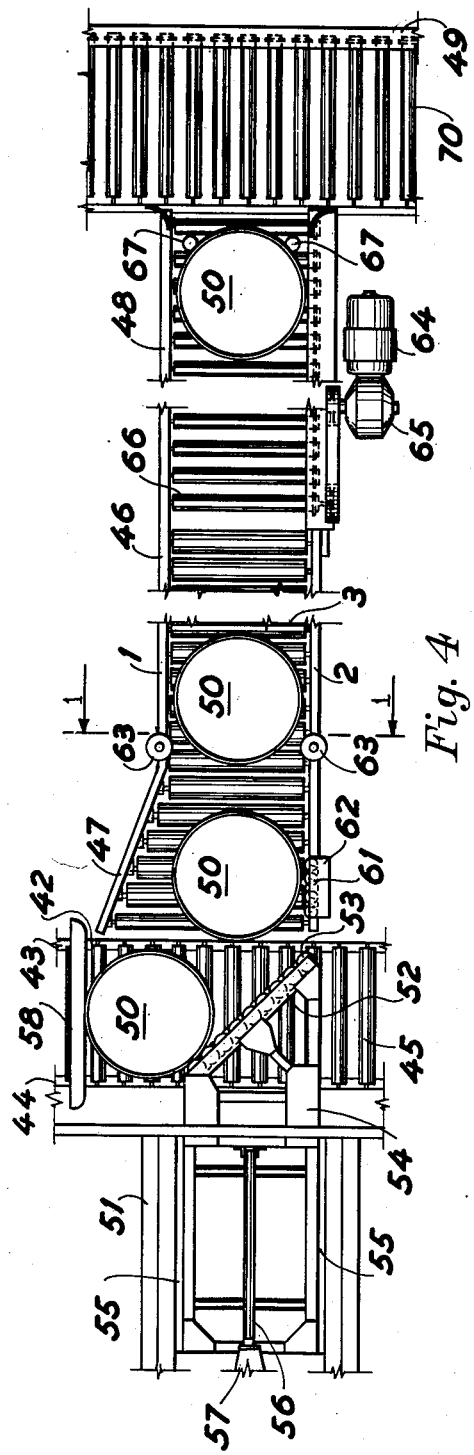
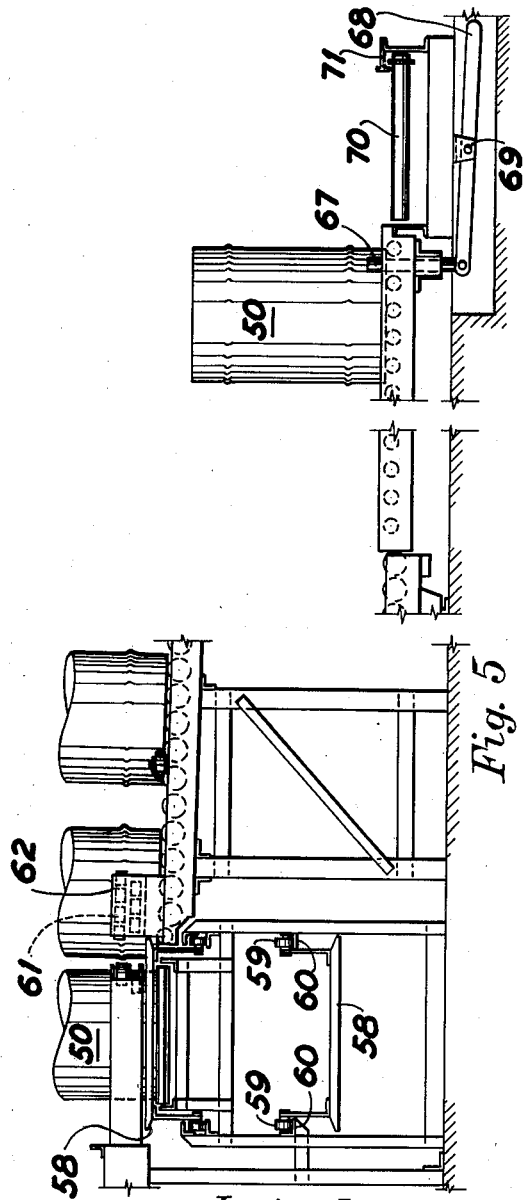
Inventors
Milton Ludwig
William R. Postlewaite
Attorneys Patented Aug. 19, 1952

2,607,459

UNITED STATES PATENT OFFICE 2,607,459

RETARDING ROLLER FOR CONVEYERS

Milton Ludwig, Berkeley, and William R. Postlewaite, Menlo Park, Calif., assignors to California Research Corporation, San Francisco, Calif., a corporation of Delaware Application September 14, 1948, Serial No. 49,278

4 Claims. (Cl. 193—37)

The present invention relates to gravity conveyor systems and more particularly to apparatus and methods of operating a gravity conveyor system of the multiple roller type.

In the past it has been customary to provide conveyor systems of either the gravity conveyor type or the positively driven type, or in varying applications, a combination of these two types. While the positively driven type, which generally comprises either motor control for each individual roller, chain and sprocket drive for a plurality of rollers, or by pusher bars moving articles along freely rotatable rollers, are very satisfactory for controlling the movement of articles along the conveyor system, these systems are very expensive, both in initial outlay of investment and maintenance. Hence, positively driven sections for conveyor systems are only used when the requirements for control of the articles are extremely important, and this type of conveyor has been almost exclusively used where it is necessary to convey the articles over a very long distance or the articles are extremely frangible and subject to breakage or damage.

While gravity roller systems, which generally comprise merely rotatable rollers mounted in side-supporting members, are relatively inexpensive with respect to both initial investment and maintenance, the principal limitation of this type of system lies in the fact that the only control of the velocity of articles moving over the system is determined by the length of the conveyor, the slope of the system, the weight of the articles, the polar moment of inertia of the rollers, and the friction of the roller bearings. When a group of articles of substantially the same weight and size are conveyed over a given length of a gravity conveyor, it is obvious that the principal control over the velocity of the articles moving down the system is by varying the slope of the conveyor. While in some cases it may be possible to determine an optimum slope for the system, in the usual application it has been found that a slope sufficiently steep to insure continuous movement of articles down the system may not be steep enough to permit the articles to start down the system from a standing stop on the conveyor. It has also been found in practice that the inertia of the rollers may be varied to provide a certain amount of controlling force on the velocity of articles moving down the system; however, this expedient has proved effective only when the articles are sufficiently spaced apart so that the rollers come to rest before the succeeding article comes in contact with the roller. It is obvious that, if the inertia of the rollers is increased to provide this braking action, it is necessary to space articles further apart to permit the rollers to come to rest before the next article contacts the roller. This is due to the fact that the energy of the articles imparted to the roller must be dissipated, for example, as heat by friction in the bearings of the rollers themselves. If the rollers have not come to rest before the succeeding articles contact the rollers, only a fraction of the energy required to accelerate the rollers from zero velocity is required to bring the roller to either the same or even a higher velocity than the exit velocity imparted by the preceding article. Under these circumstances, the articles subsequently placed on the conveyor tend to catch up with the preceding articles. This inherent characteristic of a gravity roller system often produces a damaging impact between article. Under these circumstances, the articles to a subsequent article overtaking a previous article on the conveyor. If articles are permitted to accumulate at the bottom of the conveyor, a damaging impact may occur between the rapidly-moving articles and those resting on the conveyor.

One of the most severe demands placed upon a gravity conveyor system is the conveying of a train of articles of substantially the same size and weight. With a train of articles the potential energy of the articles due to position will, of course, be substantially a multiple of the potential energy of a single article. Due to the fact that the only braking force for the articles is derived from the energy transferred to the rollers from the articles in accelerating and maintaining the velocity of the rollers, the articles must transfer their energy to the rollers at the same rate to prevent acceleration. However, this condition cannot be obtained because the energy required to maintain an initially rotating roller at the same or even a higher velocity is only a fraction of the energy required to accelerate it from rest. Therefore, with a train of articles the total braking force available for the articles is only slightly more than for single articles whereas the energy in the articles is substantially a multiple of the single articles and the net effect is cumulative. Hence, the equilibrium velocity (the velocity at which the articles will neither accelerate or decelerate) of the train will be greater than for single articles and the danger of damage by impact will be greater.

In the prior art, it has been proposed to use external braking arrangements for the rollers by means of either friction brakes bearing against a plurality of rollers or by means of an inflatable hose bearing against a plurality of rollers. While these means have been effective when a system is first installed, unless careful maintenance is given to the braking arrangements and the controlling means, the brakes soon go out of adjustment and exert little or no braking force upon the rollers. Another source of trouble in these braking arrangements develops when the articles being conveyed are filled with liquid. As frequently happens, one of the liquid-filled articles may leak, and thereby moistens the rollers and braking medium so that the coefficient of friction between the rollers and the brake is greatly changed, and hence, the braking arrangements are thrown out of adjustment.

While the above described limitations and deficiencies of conveyor systems have long been known in the art, prior to this invention no successful means for varying the retarding force in relation to the velocity of the articles moving down the system has been proposed. Among the suggested means for controlling the braking action on articles passing down a gravity conveyor system has been the suggestion of a hollow roller having a plurality of loose weights, such as lead shot, disposed within the roller. While this arrangement may satisfy the requirement of aiding in the stopping of the rollers subsequent to the passage of articles over the rollers, there are two serious deficiencies in this system of braking the roller. First, the braking force does not increase appreciably with the speed of the roller; and second, when articles are stopped along the conveyor system, the starting torque for the roller is significantly higher than the starting torque of a plain, solid or hollow roller.

It is therefore an object of the present invention to provide a method of operating a gravity conveyor system whereby the rate of descent of articles being conveyed by the system may be controlled so that fragile or frangible articles will not be damaged by impact between the articles either while moving down the system or by moving articles striking stationary articles being collected along the conveyor system.

Another object of this invention is to provide a gravity conveyor system wherein an exceptionally long declined run is practicable without the danger of damage to the packages or articles being conveyed.

A further object of this invention is to provide a fully automatic gravity system capable of controlling the speed of the articles passing down the system without the necessity of complex and expensive control mechanisms for the individual rollers.

A still further object of this invention is to provide a roller conveyor system wherein the braking effect on the articles passing down the system increases with the velocity of the articles, so that articles entering the system at a high velocity may be retarded to a satisfactory limit, and articles stopped along the system may be accelerated without the use of power mechanism.

Another object of this invention is to provide a roller conveyor system which compares favorably with the cost of a conventional gravity roller system, but which is much cheaper than the cost of power driven systems, both in initial outlay of investment and in maintenance costs, and cheaper than the initial cost and maintenance of external braking arrangements for gravity roller systems.

Further objects and advantages of this invention will become apparent from the following description taken in conjunction with the accompanying drawings.

In the drawings:

Fig. 4 is a partial plan view of a complete conveyor system according to the present invention in which a plurality of drums is shown descending the conveyor system. A portion of the conveyor system has been broken away for purposes of clarity in the drawing.

Fig. 5 is an elevation view of the system shown in Fig. 4 with a portion of the declined roller system broken away in the same manner as in Fig. 4 to more fully delineate the interrelationship of the conveyor elements.

Figure 1:
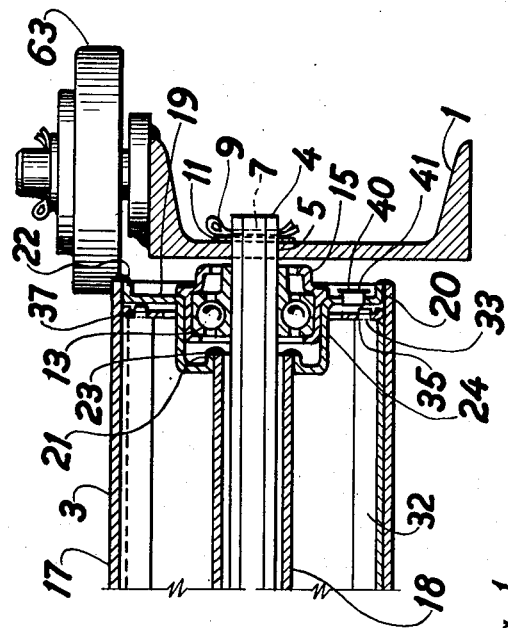
Fig. 1 is a cross-sectional view of a portion of a conveyor system according to the invention, with a typical conveyor roller shown in section along a plane parallel to the longitudinal axis, in the direction of arrows 1—1 in Fig. 4.

Referring to the drawing, a pair of supporting members 1 and 2, which, as shown, may be a pair of channel members, are provided for supporting roller 3 by means of shaft 4 which extends through openings 5 and 6 in channel members 1 and 2. As more clearly shown in Fig. 2, shaft 4 is octagonal in shape in the present embodiment and the openings 5 and 6 in members 1 and 2 are likewise octagonal to prevent shaft 4 from turning. For the purpose of holding shaft 4 between members 1 and 2, a pair of holes 7 and 8 have been provided in shaft 4 adjacent the ends thereof, and a pair of cotter pins 9 and 10 as well as washers 11 and 12 have been added. In this manner the shaft 4 is not only held against rotation, but is also located between the supporting members 1 and 2. Roller 3 is rotatably mounted on shaft 4 by means of ball bearings 13 and 14 mounted adjacent the ends of the roller 3 and shaft 4. Bearings 13 and 14 likewise have an octagonal bore through the inner race, so that the inner races of the bearings may be non-rotatably mounted upon shaft 4. Bearings 13 and 14 are provided preferably, but not necessarily, with dust shields 15 and 16 formed about the outer races of bearings 13 and 14 and surrounding the extended hub of the inner race of the bearings.

Figure 2:
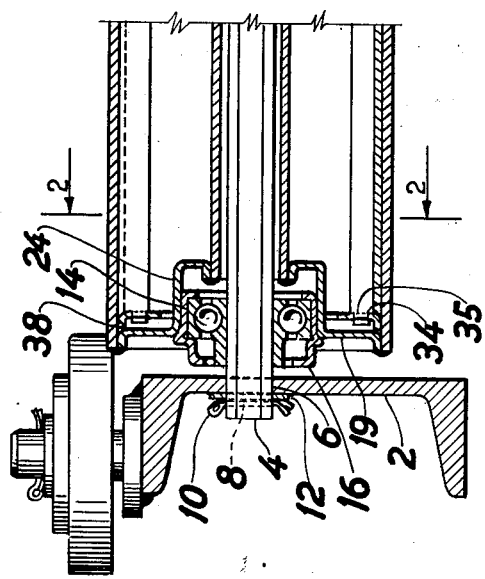
Fig. 2 is a cross-sectional view taken in the direction of arrows 2—2 shown in Fig. 1.

In the embodiment shown in Figs. 1 and 2, roller 3 comprises a pair of cylindrical shells 17 and 18. The outer shell 17 is the load carrying surface for roller 3. In order to maintain inner cylindrical shell 18 in both concentric and unitary relation to the outer cylindrical shell 17, a pair of annular members 19 are provided, each having a lip 20 turned at the outer edge of the annular members so that the outer periphery is flush with the innermost surface of cylindrical shell 17, and lips 21 are formed at the inner radii of the annular members 19, so that outer surface of cylindrical shell 18 is flush with the inner diameter of annular members 19. Annular members 19 are then integrally connected to outer shell 17 and inner shell 18 by means of weld beads 22 and 23, respectively, to form an enclosed volume within roller 3. In order to rotatively mount roller 3 upon bearings 13 and 14, annular members 19 are provided with an axially elongated section 24 having a suitable diameter to engage the outer races of bearings 13 and 14.

Figure 3:
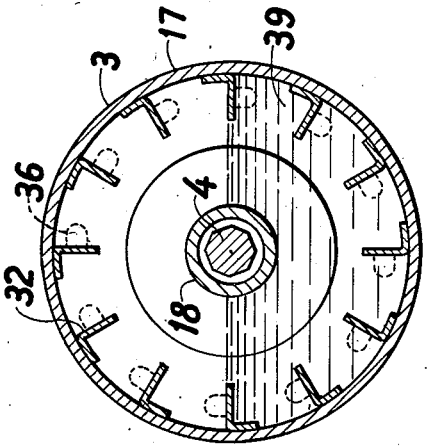
Fig. 3 is a partial cross-sectional view of a roller conveyor system with a modified type of roller construction according to the present invention.

In Fig. 3 a modification of the roller 3 is shown wherein the outer cylindrical shell 17 is rotatably mounted upon a stub shaft 24 by means of a cup member 25 having a lip 26 turned at the outer edge of the cup member which is adapted to engage the inner diameter of cylindrcial shell 17. Cup 25 is provided with an axially extending section adapted to engage a ball bearing 13 in the same manner as shown in the embodiment of Fig. 1. In order to rigidly mount stub shaft 24 to support member 1, a lug 27 is preferably welded to the outside of support member 1 and a hole 28 drilled and tapped through both lug 27 and supporting member 1. An enlarged section 29 is provided on the end of stub shaft 24 and suitable threads cut thereon to engage the threaded portion of hole 28. A hexagonal head 30 is then provided on the outer end of stub shaft 24 so that the shaft may be secured to lug 27. It will be noted in this embodiment that a dust shield 15 is likewise provided for bearing 13 and that cup member 25 is welded to cylindrical shell 17 by a weld bead 31. In other particulars, the embodiment shown in Fig. 3 is similar to that shown in Fig. 1, and hence, reference may be had to the further description of Fig. 1 for the details of the embodiment shown in Fig. 3.

In order to provide the desired velocity-retarding force characteristic for the rollers, we have provided a plurality of longitudinal vanes 32 extending radially inwardly from the inner surface of shell 17 toward the center of the roller. While vanes 32 may be either welded to shell 17 or riveted thereto, we have found it advantageous for easy assembly of the rollers to provide a cage arrangement or member comprising a pair of annular members or end rings 33 and 34 having radial slots 35 therein, corresponding to each of the vane members 32. Vane members 32 in turn have tabs 36 at each end of the vanes 32 adapted to pass through slots 35 in the annular members 33 and 34. In assembling the cage arrangement, tabs 36 for each of the vanes 32 may be passed through the slots 35 in each of the annular members 33 and 34, and tabs 36 then bent over and spot welded in place. By this arrangement the entire cage may be inserted in the roller. Annular members 33 and 34 are provided with lips 37 and 38, respectively, which are adapted to tightly engage the inner surface of shell 17 of the roller and to which it may be spot welded so that no relative movement between shell 17 and the cage assembly is possible. To provide the desired braking force on roller 3, the roller is filled substantially half full with a dense fluid 39. In order to add fluid 39 to roller 3 after assembly, a bore 40 is provided in end member 19 and a suitable plug 41 is provided to seal the interior of roller 3. While the density of the fluid 39 required to produce the desired braking effect will be dependent upon the diameter of roller 3 and the dimensions of vanes 32, we have found that with a roller having a diameter of about 4½ inches and a length of approximately 2 feet with twelve ⅝-inch vanes, a fluid having a specific gravity from about 1.4 to 1.6 will produce a braking force of about 2 lbs. at a surface velocity of approximately 75 feet/min. upon the roller. A very satisfactory fluid for this purpose is an aqueous solution of potassium carbonate having a specific gravity of about 1.56. Other similarly dense liquids, either organic, such as carbon tetrachloride, or inorganic, such as various aqueous salt solutions, may equally well be used, so long as their viscosity is comparable to that of water or relatively dilute salt solutions.

Referring now to Figs. 4 and 5, a complete conveyor system is shown which incorporates the hydraulically braked rollers shown in Figs. 1, 2 and 3. This system comprises a header 42 with which is associated a pair of side supporting members 43 and 44 adapted to rotatably mount a plurality of solid rollers 45. While header 42 is shown connected to a single lateral 46, it will be understood that a plurality of these laterals may be provided, depending upon the number of different units to be conveyed and separated from the header 42. As shown, lateral conveyor 46, which is of the declined gravity type, comprises the side supporting members 1 and 2 and has a plurality of hydraulically braked rollers 3 rotatably mounted on supporting members 1 and 2 which are downwardly declined as shown in Fig. 5. The widened portion of lateral 46 is provided to permit the easy introduction of the articles to be conveyed by the system. As shown in Fig. 4, this widened portion is provided by a side supporting member 47 which serves in place of side supporting member 1 for rotatably mounting a plurality of progressively longer rollers of the same type as rollers 3. At the end of lateral conveyor 46 a power driven section 48 is provided to control the movement of articles from the end of the gravity conveyor system, and an exit conveyor 49 at right angles to the power driven section 48 is provided to conduct away the articles conveyed by lateral 46 and power section 48.

As shown in Fig. 4, the packages 50, which in the present embodiment are shown to be barrels or drums, are arranged to be moved onto the declined conveyor system 46 from header 42 by means of a deflector arrangement designated generally as 51. The deflector arrangement comprises a deflector bar 52 provided with a plurality of rollers 53 which are substantially perpendicular to the plane of movement of the drums or packages. Deflector bar 52 is held at substantially a 45° angle to header 42 by a truss arrangement 54, which is adapted to slide on a pair of tracks 55, so that the truss arrangement and deflector bar may be retracted and extended with respect to header 42. In order to operate the deflector arrangement, an operating shaft 56 of a fluid-actuated motor 57 (not shown) is connected to the supporting structure of truss 54. It will be understood by those skilled in the art that fluid-actuated motor 57 may be operated either manually or automatically from a remote position to properly segregate packages 50 passing along header 42. In order to move packages 50 along header 42, a power driven system comprising a plurality of pusher bars 58 are mounted upon a set of rollers 59, which in turn are adapted to be moved along track 60. It will be understood that an endless chain interconnecting the plurality of pusher bars 58 is provided and the chain driven by a suitable power source. It will be noted in Fig. 5 that pusher bar 58 is adapted to pass below deflector bar 52 when in an extended position, so that the deflector bar will not interfere with the operation of pusher bar 58 and interrupt the movement of the packages to lateral 46. In order to assure the free passage of packages 50 from header 42 to declined gravity system 46, a plurality of rollers 61 are mounted in a side member 62 above side supporting member 1. A pair of guide rollers 63 is provided at intervals along the top of side supporting members 1 and 2, as shown in Figs. 1 and 3 to insure the free passage of packages along the system.

At the discharge end of the gravity conveyor system 46, the power conveyor section 48 is provided with a motor 64 having a gear reducing mechanism 65 which is adapted to drive through a belt or chain arrangement one of the plurality of solid rollers 66, which in turn are chain driven in a manner well-known in the art. In the present embodiment motor 64 is adapted to run continuously to move packages from the gravity system 46 to the end of power conveyor 48; however, it will be appreciated that motor 64 may be intermittently operated by means of a limit switch actuated by the position of the packages along the conveyor system. Mechanical stops 67 are provided at the end of power system 48 to stop the packages and permit a train of packages to collect along the length of power section 48, and hence back along the length of gravity conveyor system 46. In order to remove stops 67 and permit the packages to pass from lateral 46 to exit conveyor 49, a lever 68 pivoted upon a supporting member 69 is provided below conveyor 49. As previously stated, conveyor 49 is perpendicular to the length of lateral 46 and power section 48, and may be a power driven section, as shown in Fig. 4, wherein rollers 70 are each provided with a driving sprocket 71, so that rollers 70 may be power driven by a chain (not shown).

In operation, the packages or barrels 50 are conveyed along the header section 42 by the power-driven pusher bars 58. As stated above, only a single lateral conveyor is shown in the present embodiment; however it will be understood by those skilled in the art that a plurality of these laterals may be provided so that similar packages having a different destination may be segregated in independent laterals. For this purpose the proper deflector bar 52 may be brought into position by operation of the associated fluid-actuated motor 57, so that the packages may be shunted to the corresponding lateral. Accordingly, when the deflector bar 52 is in position, pusher bar 58 urges packages 50 along the header 42 until the package comes in contact with the rollers 53 on deflector bar 52. When the packages have been moved onto the declined gravity portion of the conveyor system, the barrels or packages are free to travel under gravity force alone.

While packages 50 may be sufficiently spaced along the header 42 to insure the complete passage of packages 50 down lateral 46, before a succeeding package is introduced from header 42, it will be appreciated that the most efficient use of the header 42 can be made when it is possible to introduce articles in close succession, and quite frequently it is necessary to introduce a number of articles in such close succession that they are in the form of a train. While this method of introducing packages has been satisfactory when a fairly short run is to be used on the lateral 46, or when the packages are sufficiently rugged to withstand a great deal of impact, it has long been appreciated that some retarding means are necessary to make a long gravity run practicable. For this purpose rollers 3 have been provided with internal braking means comprising the dense fluid 39 and the radial vanes 32, which are adapted to pass through the fluid 39. In order to obtain the desired retarding torque-velocity characteristic from the rollers, the fluid 39 is arranged within cylinder 17 so that the vanes 32 contact the fluid 39 at substantially zero degrees to the surface of fluid 39.

Two advantages are obtained by this arrangement. The first of these is that the rollers may be installed in the conveyor system without regard to the direction of rotation of the roller. The second advantage is that liquid will not be trapped between vanes 32 and cylinder 17, thereby producing an unbalanced force opposed to the direction of the rotation of the roller and requiring an additional force over and above that required to turn the roller against the friction of ball bearings 13 and 14. The latter advantage is particularly important where the packages have been allowed to collect along the length of the conveyor system and it is desired to start the packages again from a standing stop without the addition of a starting force to the packages. In addition to the low starting torque for the hydraulically braked rollers, as just described, the interaction of the radial vanes 32 and the dense fluid 39 is such that when roller 3 is rotated by the packages, vanes 32 tend to sweep the hydraulic fluid 39 in the direction of rotation of the vanes about the shaft 4, and thereby move the center of gravity of fluid 39 to a point out of coincidence with the downward projection of the center of gravity of rollers 3 and in such a direction as to present a retarding torque variable with the speed of the roller. Therefore, when roller 3 is accelerated, the retarding force is continuously increased by the interaction of vanes 32 and fluid 39 by moving the center of gravity of fluid 39 further away from coincidence with the downward projection of the center of gravity of the roller. It will be appreciated that the only limiting feature of this increased retardation will be found when the speed of vanes 32 has caused the fluid to be distributed evenly around the periphery of roller cylinder 17. In practice, it has been found advantageous to fill the roller substantially half full to secure minimum starting torque and maximum braking torque at operating speeds. With the roller more than half full, it was found difficult to shift the center of gravity of fluid 39 sufficiently to obtain proper braking torque.

When the packages have reached the lower end of the controlled gravity descent section 46, the packages are then arranged to be moved by the power operated section 48 until the first package comes in contact with stops 67 at the end of power section 48. Then packages 50 are allowed to accumulate first, along the power section 48, and then, along the declined gravity section 46 until a complete shipment of packages has been assembled. When the packages have been assembled, stops 67 may be removed and the packages permitted to pass onto exit conveyor system 49. While the packages on power system 48 will readily pass onto conveyor system 49, the packages collected along lateral 46 must start under their own power to make the system completely automatic, and it is for this reason that it is important that the rollers 3 have little or no initial retarding force, except the normal friction between the rollers and the bearing supports. With rollers constructed in accordance with our invention and being filled with fluid 39 to the depth of one-half the diameter of shell 17, there will be no appreciable initial retarding force due to trapped liquid between vanes 32 and shell 17 and therefore, the rollers may be started by the gravity component due to the sloping surface of section 46 under packages 50.

By the use of the hydraulically braked rollers according to this invention, it is possible to control the speed of articles passing down a gravity conveyor system, so that fragile or frangible articles may be conveyed without danger of breakage due to impact either between the articles while moving down the system, or between moving articles and stationary objects upon the system. It is further possible by this invention to provide an extremely long gravity run, which has heretofore been impossible due to the danger of damage by the articles attaining such a velocity that impact damage will result. It is further possible by this system to operate a gravity conveyor system without complex and expensive control mechanism for the individual rollers, since each roller is provided with an integral braking arrangement having such a varying retarding force-velocity characteristic that articles entering the system at higher than the desired velocity may be properly retarded to a safe value or articles may be accelerated from zero without the use of power mechanisms. It will be appreciated by those skilled in the art that the present invention provides a roller conveyor system which is extremely simple and rugged in construction, yet positive in operation, and inexpensive both in initial cost and maintenance.

While modifications and variations of the foregoing system will occur to those skilled in the art, these may be made without departing from the spirit and scope of the invention. In particular, where the size and weight of the articles or packages will permit, some of the hydraulically braked rollers may be replaced at equal intervals by common rollers. In this way the braking action may be applied either in a smaller ratio to the velocity when the packages are large enough to span the interval between the braked rollers, or intermittently when the articles do not span the interval. In addition, modifications may be in the internal braking arrangements for the rollers and the interrelationship of the gravity section with the power driven sections of the system. Therefore, we intend to limit the invention only within the scope of the appended claims.

We claim:

1. A roller for a gravity conveyor system comprising a cylindrical shell, end closures for said shell, shaft means providing a central, longitudinal axis of rotation for said shell, a plurality of longitudinally extending circumferentially spaced vanes projecting inwardly from the inner surface of said shell, a liquid within said shell, the amount of said liquid and the direction of inward projection of said vanes being such that those vanes leaving the liquid are substantially parallel to the upper surface of the liquid during initial rotation of the shell while said axis of rotation is horizontal, the distance which said vanes project inwardly from said shell being substantially less than the depth of the liquid in the shell whereby each vane is entirely submerged in the liquid during a substantial portion of a revolution of the shell.

2. A roller as defined in claim 2 in which said liquid has a specific gravity of from 1.4 to 1.6 and a viscosity approximating that of water.

3. A roller for a gravity conveyor system comprising a cylindrical shell, end closures for said shell, means providing a central longitudinal axis of rotation for said shell, a plurality of longitudinally extending circumferentially spaced vanes projecting radially inwardly from the inner surface of said shell, a liquid within said shell, the amount of said liquid being such as to approximately half fill said shell, the radial dimension of said vanes being substantially less than the depth of the liquid in said shell when said axis of rotation is horizontal whereby each vane is entirely submerged in said liquid during approximately one-half revolution of said shell.

4. A roller as defined in claim 3 in which said liquid has a specific gravity of from 1.4 to 1.6 and a viscosity approximating that of water.

MILTON LUDWIG.
WILLIAM R. POSTLEWAITE.

REFERENCES CITED

The following references are of record in the file of this patent:

UNITED STATES PATENTS

| Number | Name | Date |
| --- | --- | --- |
| 268,461 | Dittmar et al. | Dec. 5, 1882 |
| 1,660,512 | Jaenicke | Feb. 28, 1928 |
| 1,695,075 | Zimmerman | Dec. 11, 1928 |
| 2,306,101 | Van Zandt | Dec. 22, 1942 |

FOREIGN PATENTS

| Number | Country | Date |
| --- | --- | --- |
| 646,692 | France | July 17, 1928 |
| 340,439 | Great Britain | Jan. 1, 1931 |